US008851666B1

(12) United States Patent
Stahl

(10) Patent No.: US 8,851,666 B1
(45) Date of Patent: Oct. 7, 2014

(54) EYEGLASS DANGLE SYSTEMS

(76) Inventor: Walter Stahl, Florence, KY (US)

( * ) Notice: Subject to any disclaimer, the term of this patent is extended or adjusted under 35 U.S.C. 154(b) by 258 days.

(21) Appl. No.: 13/487,215

(22) Filed: Jun. 3, 2012

Related U.S. Application Data

(60) Provisional application No. 61/494,807, filed on Jun. 8, 2011.

(51) Int. Cl.
*G02C 11/02* (2006.01)
(52) U.S. Cl.
USPC .............................................. 351/52; 351/51
(58) Field of Classification Search
CPC ................................. G02C 11/02; G02C 5/143
USPC ............... 351/51, 52, 41, 158; D16/330, 336, D16/341; 63/23
See application file for complete search history.

(56) References Cited

U.S. PATENT DOCUMENTS

| 4,968,128 | A | * | 11/1990 | Mendola .......................... 351/52 |
| 5,024,515 | A | | 6/1991 | Beckemeyer et al. |
| D324,871 | S | | 3/1992 | Cordet et al. |
| 5,161,234 | A | | 11/1992 | Nitta |
| 5,896,184 | A | | 4/1999 | Lowe et al. |
| 6,520,635 | B1 | | 2/2003 | Ignatowski |
| D564,574 | S | | 3/2008 | Andrews |

* cited by examiner

*Primary Examiner* — Hung Dang
(74) *Attorney, Agent, or Firm* — RG Patent Consulting, LLC; Rachel Gilboy

(57) ABSTRACT

An eyeglass dangle system comprising an eyewear assembly and charm(s). The eyewear assembly includes a first and second set of frames joined via a nose bridge; a first lens and a second lens coupled to the first frame and the second frame respectively; a first temple arm and a second temple arm coupled to the first frame and the second frame. The band is oval-shaped and is located on the charm and is removeably-attachable to the first temple arm and/or the second temple arm. The first ring and the second ring couple the charm onto the band. The charm further comprises at least one first eye while the band further comprises at least one second eye. The charm is coupleable to the band via inserting the first ring through the first eye and inserting the second ring through the second eye. The charm comprises a charity-identifier.

17 Claims, 5 Drawing Sheets

EYEGLASS DANGLE SYSTEMS

CROSS-REFERENCE TO RELATED APPLICATION

The present application is related to and claims priority from prior provisional application Ser. No. 61/494,807, filed Jun. 8, 2011 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of decorative ornaments and more specifically relates to decorative ornaments for eyewear.

DESCRIPTION OF THE RELATED ART

Bracelets, t-shirts, and other similar garments and accessories can be made to display the logos of charities and organizations for the purpose of generating public awareness and interest in these organizations. However, these items are often worn below eye level, and therefore may not be noticed by individuals surrounding the people wearing them. This can prevent the messages of these organizations from reaching many people, and therefore may reduce support for these causes.

Eyewear is typically worn on or over the eyes, for fashion or adornment, protection against the environment, and to improve or enhance visual perception. Common forms of eyewear include glasses (also called eyeglasses or spectacles), sunglasses, and contact lenses. Eyewear can also include more utilitarian forms of eye protection, such as goggles for example that may be used during skiing, or while performing mechanical processes. Glasses, spectacles are frames normally bearing lenses worn in front of the eyes. These glasses are traditionally used for vision correction or eye protection. Safety glasses are a kind of eye protection used against flying debris. Other glasses protect the wearer against visible, near visible light or radiation. Sunglasses allow better vision in bright daylight, and may protect against damage from high levels of ultraviolet light. Certain types of glasses may be used for viewing visual information such as stereoscopy or simply just for aesthetic or fashion purposes.

Various attempts have been made to solve the above-mentioned problems such as those found in U.S. Pat. Nos. 5,896,184; 6,520,635; 5,161,234; 5,024,515; D324,871; and D564,574. This prior art is representative of ornamental eyewear. None of the above inventions and patents, taken either singly or in combination, is seen to describe the invention as claimed.

Ideally, ornamental eyewear should be safe in-use and yet, would operate reliably and be manufactured at a modest expense. Thus, a need exists for a reliable eyeglass dangle system to spread awareness of various organizations and charities in a subtle and stylish manner and to avoid the above-mentioned problems.

BRIEF SUMMARY OF THE INVENTION

In view of the foregoing disadvantages inherent in the known ornamental eyewear art, the present invention provides a novel eyeglass dangle system. The general purpose of the present invention, which will be described subsequently in greater detail is to spread awareness of various organizations and charities in a subtle and stylish manner.

Eyeglass Dangle is designed to spread awareness of various organizations and charities in a subtle, yet classy and stylish manner; the charm holding/representing sentimental meaning to the user-wearer and significance to on-lookers. This innovative system preferably features a set of charms designed to be applied generally to the temple portions of eyeglasses. The charms can be made to resemble the ribbons used for breast cancer awareness for example and other similar causes, and can also be made into other general shapes, such as crosses, angels, and hearts. This product may add a subtle, eye-catching statement to eyeglasses, and can also help individuals to support and spread awareness of their favorite charitable organizations.

An eyeglass dangle system (eyewear charm system) comprises an eyewear assembly and at least one (attachable) charm. The eyewear assembly preferably includes a first and second set of frames joined via a nose bridge; a first lens and a second lens coupled to the first frame and the second frame respectively; a first temple arm and a second temple arm coupled to the first frame and the second frame. The eyewear assembly comprises conventional eyeglasses. The first and the second set of frames, the first lens and the second lens, and the first temple arm and the second temple arm comprise the eyewear assembly. The at least one charm has at least one band and preferably at least two rings.

The band is preferably oval-shaped and is located on the charm and is removeably-attachable to the first temple arm and the second temple arm. Further the band on the charm comprises rubber and is flexible in preferred embodiments. The first ring and the second ring may couple the charm onto the band. The first ring and the second ring may be joined to each other. The ring is circular-shaped and comprises ferrous material or other suitable equivalent material.

The charm further comprises at least one first eye while the band further comprises at least one second eye. Additionally the charm may include gems and/or jewels. The charm is coupleable to the band via inserting the first ring through the first eye and inserting the second ring through the second eye. The charm is able to be removable attached to the eyewear assembly to create a 'meaningful' fashionable aesthetic improvement to the eyewear assembly. The charm may comprise at least one charity-identifier with or without indicia and/or recognizable coloring means (for example pink for breast cancer.) The charity-identifier on the charm may comprise at least one ribbon. The charm additionally serves as a meaningful identifier to identify the eyewear assembly more readily if set down with other similar eyewear assemblies. The charm holds sentimental meaning to the user.

A kit is also described herein including at least one eyewear assembly; a plurality of charms in different designs representing charities and organizations; and a set of user instructions.

A method of using an eyeglass dangle system (eyewear charm system) is disclosed herein preferably comprising the steps of: choosing a user-selected eyewear assembly; choosing a user-selected charm having at least one flexible band; inserting the flexible band on the charm over a temple arm of the eyewear assembly; and donning the eyewear assembly comprising the charm to make a 'meaningful' fashion statement.

The present invention holds significant improvements and serves as an eyeglass dangle system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, eyeglass dangle system, constructed and operative according to the teachings of the present invention

The various embodiments of the present invention will hereinafter be described in conjunction with the appended drawings, wherein like designations denote like elements.

DETAILED DESCRIPTION

As discussed above, embodiments of the present invention relate to an ornamental eyewear device and more particularly to a eyeglass dangle system to spread awareness of various organizations and charities in a subtle and stylish manner.

Generally speaking, eyeglass dangle system allows consumers to simultaneously dress up their eyeglasses and promote their favorite charities and organizations, yet not impeding or obstructing normal eyeglass operation. The invention may comprise a series of charms made in the images of various charity logos. The charms can also be made into the shapes of ribbons, puzzle pieces, and other shapes relating to specific charities, and can also be constructed to resemble angels, crosses, and other non-charity related shaped items. Several designs and embellishments may be applied to these charms. Each charm may include a silicone or rubber band (or equivalent means), designed to slide over the temple portions of eyeglasses. The material used for this component can provide the charms with flexibility, and may prevent them from sliding out of place. Smaller metal rings can be used to connect the charms to the flexible rings. The charms may be very small and subtle, adding a hint of embellishment to virtually any pair of eyeglasses. Additionally, the placement of the charms can facilitate optimal awareness of various charities and organizations.

Figure 1:
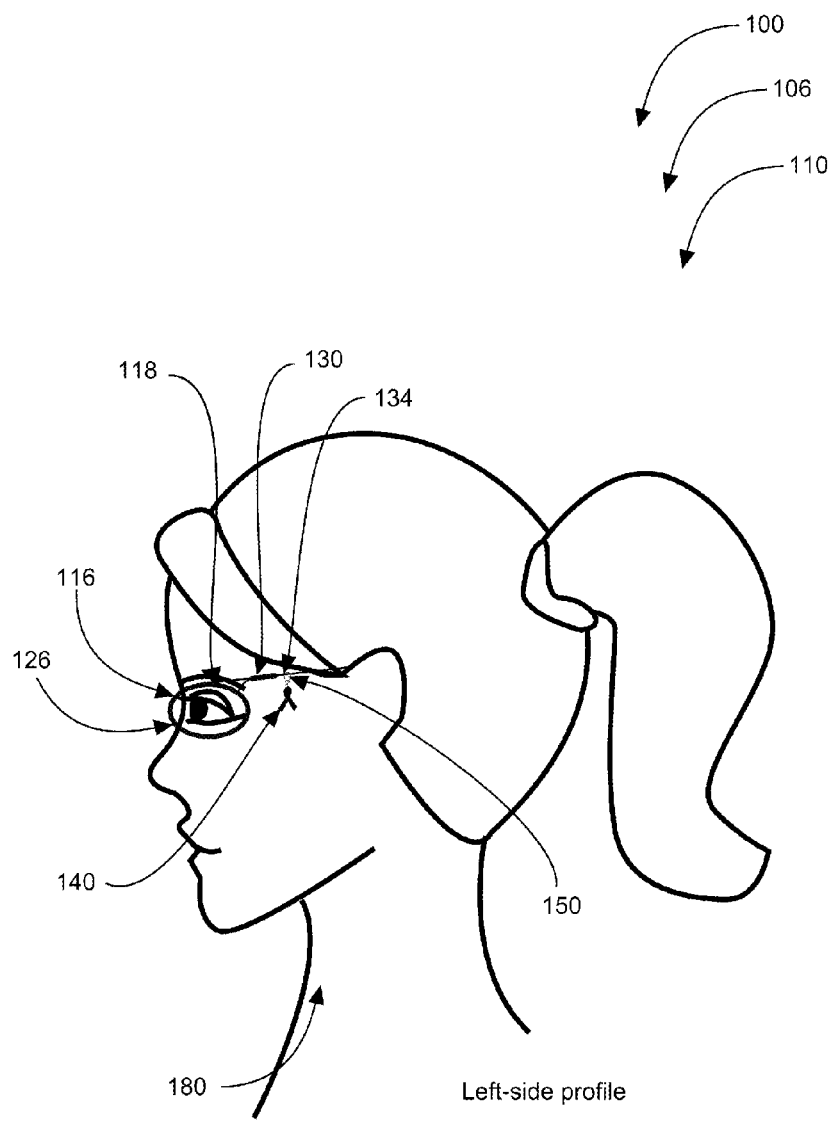
FIG. 1 shows a perspective view illustrating an eyeglass dangle system in an 'in-use condition' (left-side profile of a user-wearer) according to an embodiment of the present invention
Figure 2:
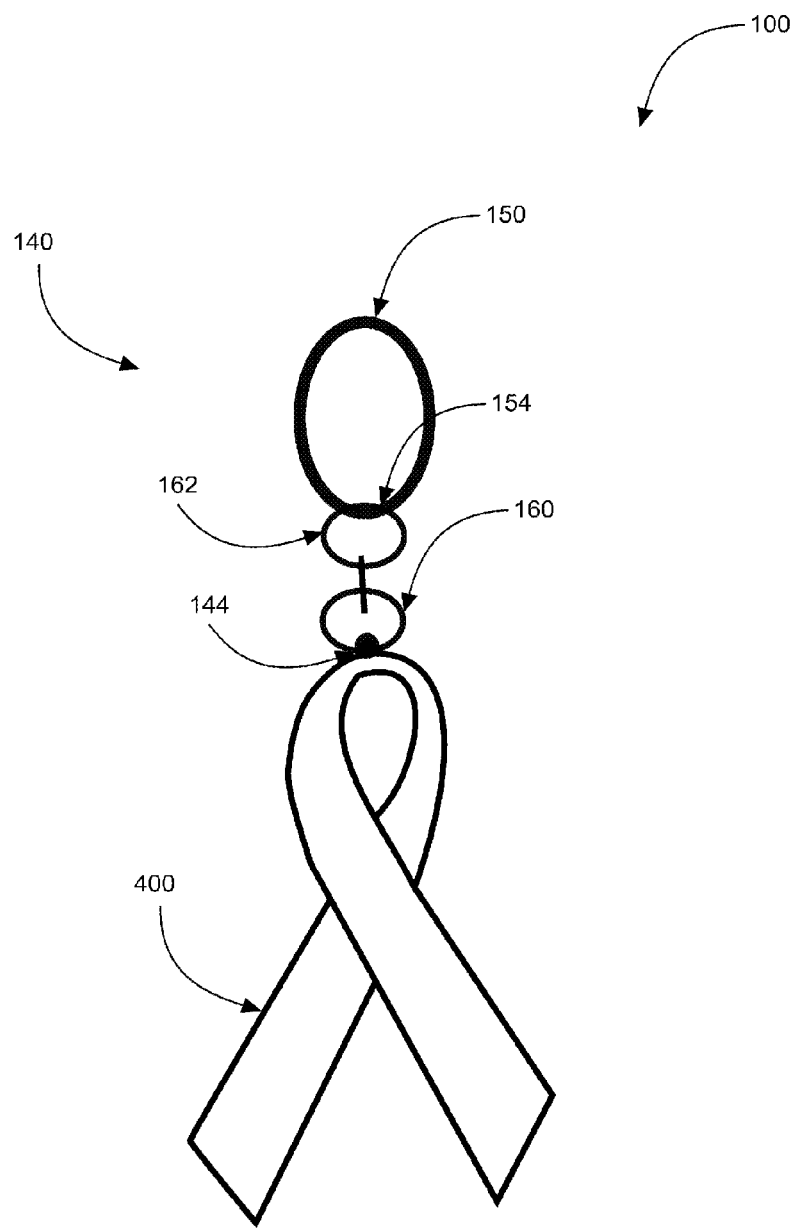
FIG. 2 is a perspective view illustrating a charm of the eyeglass dangle system according to an embodiment of the present invention of FIG. 1.
Figure 3:
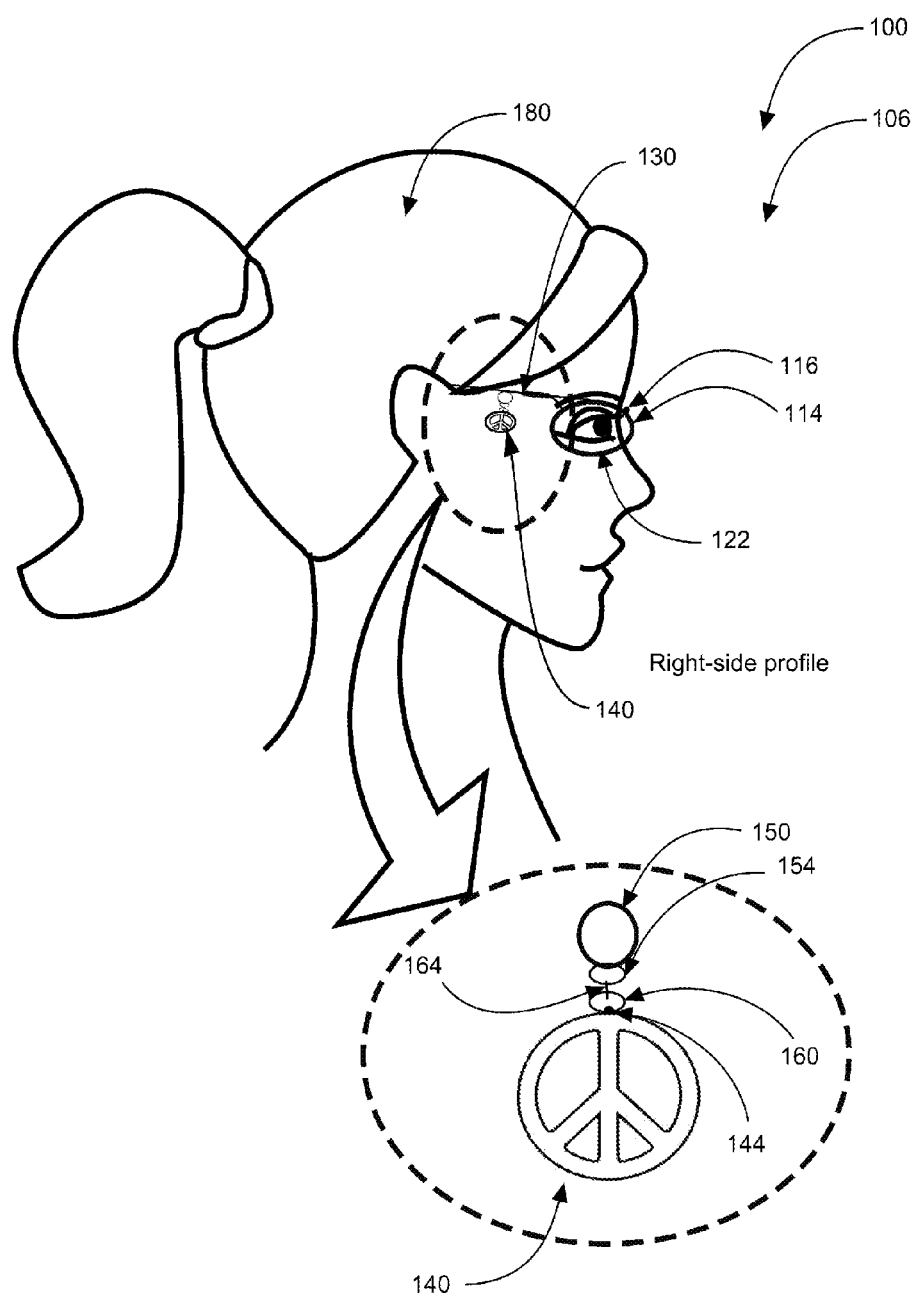
FIG. 3 is a perspective view illustrating another view of the eyeglass dangle system (right-side profile of a user-wearer) according to an embodiment of the present invention of FIG. 1.

Referring to the drawings by numerals of reference there is shown in FIG. 1-3 showing perspective view illustrating eyeglass dangle system 100 according to an embodiment of the present invention.

Eyeglass dangle system (eyewear charm system) 100 preferably comprises eyewear assembly 110 and charm 140. Eyewear assembly 110 preferably includes first frame 114 and second frame 118 joined via nose bridge 116; first lens 122 and second lens 126 coupled to first frame 114 and second frame 118 respectively; and first temple arm 130 and second temple arm 134 coupled to first frame 114 and second frame 118. First frame 114 and second frame 118, first lens 122 and second lens 126, and first temple arm 130 and second temple arm 134 preferably comprise eyewear assembly 110. Eyewear assembly 110 may comprise other components, less components or more components in alternate embodiments. Eyewear assembly 110 preferably comprises eyeglasses. Upon reading this specification, it should be appreciated that, under appropriate circumstances, considering such issues as user preferences, design preference, structural requirements, marketing preferences, cost, available materials, technological advances, etc., other eyewear arrangements such as, for example, sunglasses, safety glasses, safety goggles, etc., may be sufficient. FIG. 3 shows a right-side profile of user 180 and the present FIG. 1 shows a left-side profile.

Charm 140 preferably comprises at least one band 150 and at least two rings 160, 164 respectively. Band 150 located on charm 140 may be removeably-attachable to first temple arm 130 and second temple arm 134. First ring 160 and second ring 164 preferably couple charm 140 onto band 150. Charm 140 further comprises at least one first eye 144. Band 150 further comprises at least one second eye 154. First ring 160 and second ring 164 are joined (connectable) to each other. Charm 140 is coupleable to band 150 via inserting first ring 160 through first eye 144 and inserting second ring 164 through second eye 154.

First ring 160 and second ring 164 are both preferably circular-shaped, however other shapes may be suitable such as oval-shaped or rectangular-shaped or the like. First ring 160 and second ring 164 may also comprise ferrous material. Upon reading this specification, it should be appreciated that, under appropriate circumstances, considering such issues as user preferences, design preference, structural requirements, marketing preferences, cost, available materials, technological advances, etc., other material arrangements such as, for example, non-ferrous materials, metals, hard plastics, composites, etc., may be sufficient Band 150 is preferably oval-shaped, however other shapes for band 150 may be used such as circular-shaped for example. Band 150 on charm 140 is also preferably flexible to fit over first temple arm 130 or second temple arm 134. Band 150 may comprise rubber in preferred embodiments. Upon reading this specification, it should be appreciated that, under appropriate circumstances, considering such issues as user preferences, design preference, structural requirements, marketing preferences, cost, available materials, technological advances, etc., other material arrangements such as, for example, silicone; soft plastics, etc., may be sufficient.

Figure 4:
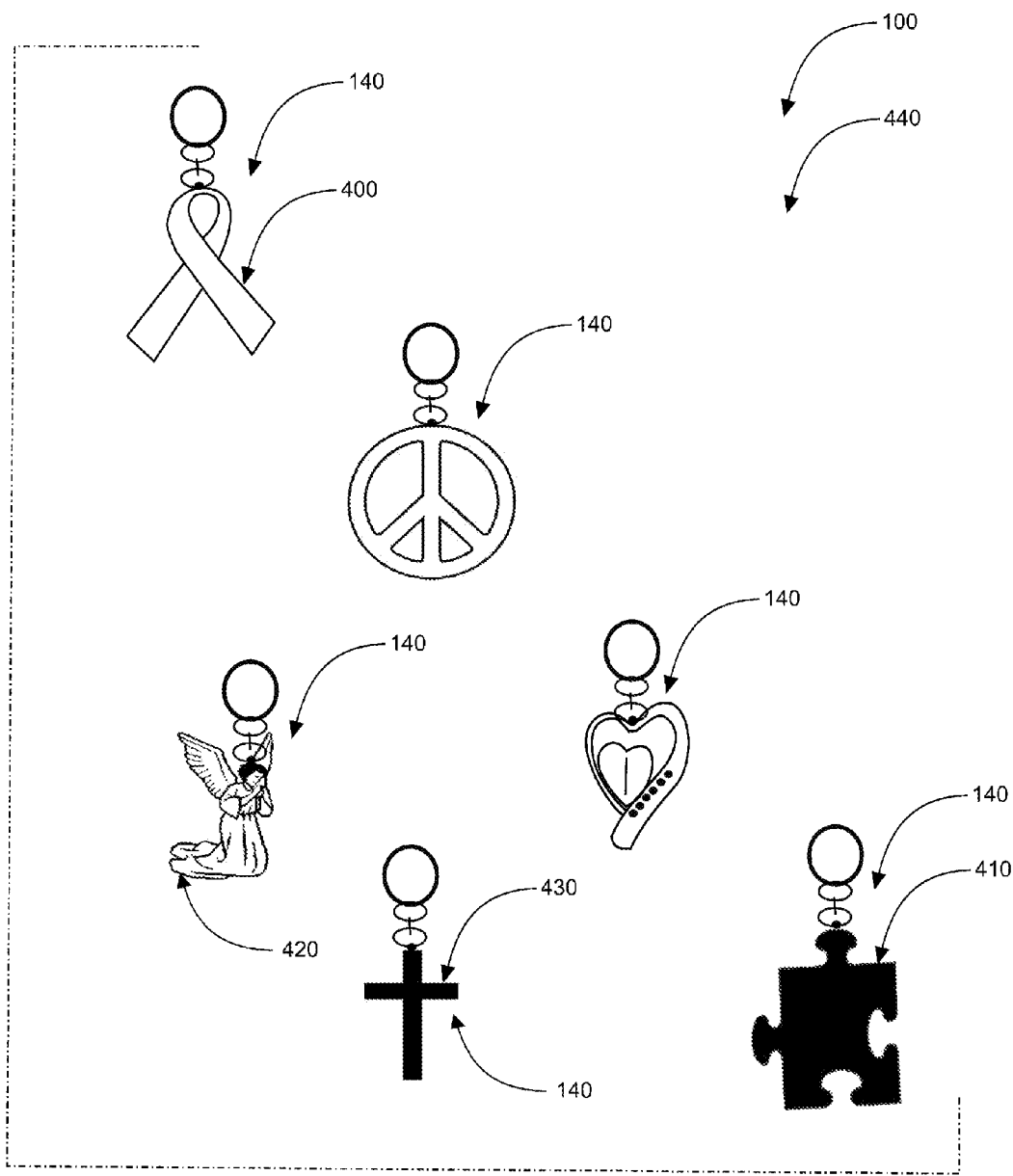
FIG. 4 is a perspective view illustrating a plurality of different charms of the eyeglass dangle system according to an embodiment of the present invention of FIG. 1.

Referring now to FIG. 4 showing perspective view illustrating a plurality of different charms 140 of eyeglass dangle system 100 according to an embodiment of the present invention of FIG. 1.

Charm 140 preferably holds sentimental meaning to user 180. Charm 140 preferably acts as a meaningful identifier to identify eyewear assembly 110 more readily if set down with other eyewear assemblies 110. Various charms (as worn) may hold sentimental meaning to user 180 as well and be recognizable to on-looker(s).

Charm 140 preferably comprises jewels or gems or similar adornment means. Charm 140 also preferably comprises at least one charity-identifier or other symbol/indicia having meaning. Charm 140 may comprise at least one ribbon 400 to represent breast cancer awareness for example. Charm 140 may also comprise at least one puzzle piece 410 to represent autism awareness. Charm 140 may further comprise at least one angel 420 to represent a charity or as a guardian angel. Charm 140 comprises at least one cross 430 to represent a religious affiliation. It should be noted that other charity symbols may be manufactured and sold as charms 140 with the consent of a given charity such as the Red Cross, Salvation Army, Make a Wish Foundation, or the military just to name a few.

Eyeglass dangle system 100 may be sold as kit 440 comprising the following parts: at least one eyewear assembly 110; a plurality of charms 140 in different designs representing charities and organizations; and a set of user instructions.

Eyeglass dangle system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
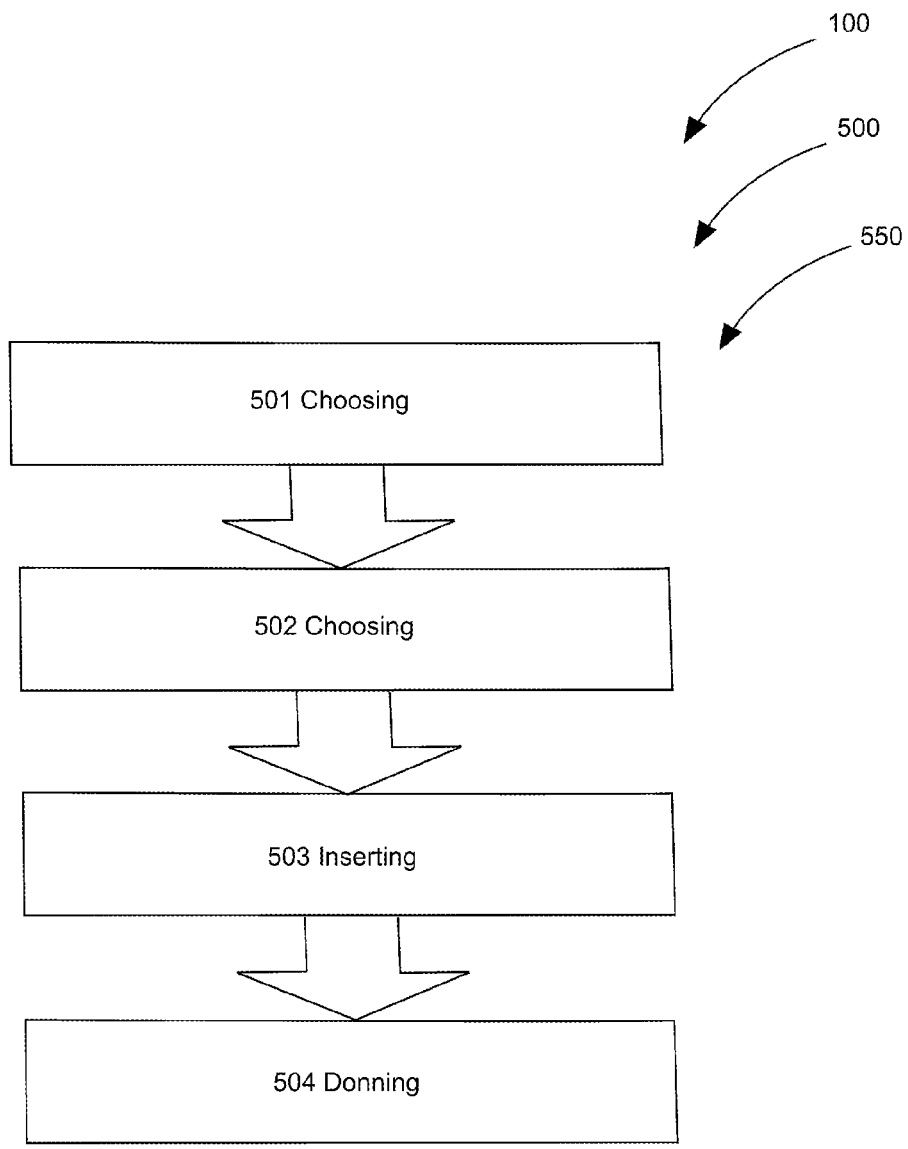
FIG. 5 is a flowchart illustrating a method of use for the eyeglass dangle system according to an embodiment of the present invention of FIGS. 1-4.

Referring now to FIG. 5, a flowchart 550 illustrating a method of using (method of use 500) eyeglass dangle systems 100 according to an embodiment of the present invention of FIGS. 1-4.

A method of using (enabling method of use 500) eyeglass dangle system 100 preferably comprises the steps of: step one 501 choosing a user-selected eyewear assembly 110; step two 502 choosing a user-selected charm 140 (preferably having at least one flexible band 150); step three 503 inserting flexible band 150 on charm 140 over temple arm(s) 130, and/or 134 of eyewear assembly 110; and step four 504 donning eyewear assembly 110 comprising charm 140 to make a meaningful fashion statement.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An eyewear charm system comprising:
   a) an eyewear assembly having;
      i) a first and second set of frames joined structured and arranged with a nose bridge;
      ii) a first lens and a second lens coupled to said first frame and said second frame respectively;
      iii) a first temple arm and a second temple arm coupled to said first frame and said second frame;
   b) at least one charm having;
      i) at least one band; and
      ii) at least two rings;
   c) wherein said first and said second set of said frames, said first lens and said second lens, and said first temple arm and said second temple arm comprise said eyewear assembly;
   d) wherein said band located on said charm is structured and arranged to removeably-attachable to first temple arm and said second temple arm;
   e) wherein said first ring and said second ring is structured and arranged to couple said charm onto said band;
   f) wherein said charm further comprises at least one first eye;
   g) wherein said band further comprises at least one second eye;
   h) wherein said first ring and said second ring are structured and arranged for joining to each other;
   i) wherein said charm is coupleable to said band via inserting said first ring through said first eye and inserting said second ring through said second eye;
   j) wherein said charm is structured and arranged with to removably attach to said eyewear assembly to create a fashionable aesthetic improvement to said eyewear assembly;
   k) wherein said charm further comprises at least one charity-identifier;
   l) wherein at least one puzzle piece is integrally formed with said at least one charity-identifier;
   m) wherein at least one angel is integrally formed with said at least one charity-identifier;
   n) wherein said charm is structured and arranged as a meaningful identifier to identify said eyewear assembly more readily if set down with other said eyewear assemblies; and
   o) wherein said charm is structured and arranged for holding sentimental meaning to said user.

2. The eyewear charm system of claim 1 wherein said eyewear assembly comprises eyeglasses.

3. The eyewear charm system of claim 1 wherein said eyewear assembly comprises sunglasses.

4. The eyewear charm system of claim 1 wherein said eyeglass assembly comprises safety goggles.

5. The eyewear charm system of claim 1 wherein said charm comprises jewels.

6. The eyewear charm system of claim 1 wherein said charm comprises gems.

7. The eyewear charm system of claim 1 wherein said ring is circular-shaped.

8. The eyewear charm system of claim 1 wherein said ring comprises ferrous material.

9. The eyewear charm system of claim 1 wherein said band on said charm comprises rubber.

10. The eyewear charm system of claim 1 wherein said band on said charm comprises silicone.

11. The eyewear charm system of claim 10 wherein said band is flexible.

12. The eyewear charm system of claim 11 wherein said band is oval-shaped.

13. The eyewear charm system of claim 1 wherein said charm comprise at least one ribbon.

14. The eyewear charm system of claim 1 wherein said charm comprises at least one cross.

15. An eyewear charm system comprising:
   a) an eyeglass assembly having;
   b) a first and second set of frames joined via a nose bridge;
   c) a first lens and a second lens coupled to said first frame and said second frame respectively;
   d) a first temple arm and a second temple arm coupled to said first frame and said second frame;
   e) at least one charm having;
   f) at least one band; and
   g) at least two rings;
   h) wherein said first and said second set of said frames, said first lens and said second lens, and said first temple arm and said second temple arm comprise said eyewear assembly;
   i) wherein said band is structured and arranged on said charm is removeably-attachable to first temple arm and/or said second temple arm;
   j) wherein said band on said charm comprises rubber;
   k) wherein said band is flexible
   l) wherein said band is oval-shaped;
   m) wherein said first ring and said second ring couple said charm onto said band;
   n) wherein said ring is circular-shaped;
   o) wherein said ring comprises ferrous material;
   p) wherein said charm further comprises at least one first eye;
   q) wherein said band further comprises at least one second eye;
   r) wherein said first ring and said second ring are structured and arranged to be joined to each other;
   s) wherein said charm comprises jewels;
   t) wherein said charm comprises at least one charity-identifier;
   u) wherein said charm comprise at least one ribbon;
   v) wherein said charm is structured and arranged to be coupleable to said band via inserting said first ring through said first eye and structured and arranged for inserting said second ring through said second eye;
   w) wherein said charm is structured and arranged to be removably attached to said eyewear assembly to create a fashionable aesthetic improvement to said eyewear assembly; and
   x) wherein said charm further comprises at least one charity-identifier;
   y) wherein at least one puzzle piece is integrally formed with said at least one charity-identifier;
   z) wherein at least one angel is integrally formed with said at least one charity-identifier;
   aa) wherein said charm is structured and arranged as an identifier to identify said eyewear assembly more readily if set down with other said eyewear assemblies; and
   bb) wherein said charm is structured and arranged to holds sentimental meaning to said user and to onlooker.

16. The eyewear charm system of claim 15 further comprising a kit including at least one eyewear assembly; a plurality of charms in different designs representing charities and organizations; and a set of user instructions.

17. A method of use for an eyewear charm system of claim 15 comprising the steps of:
   a) choosing a user-selected eyewear assembly;
   b) choosing a user-selected charm having at least one flexible band;
   c) inserting said flexible band on said charm over a temple arm of said eyewear assembly; and
   d) donning said eyewear assembly comprising said charm to make a meaningful fashion statement.

* * * * *